United States Patent [19]
Janssen et al.

[11] 3,863,501
[45] Feb. 4, 1975

[54] MAGNETOSTRICTIVE SENSOR FOR A FLOWMETER

[75] Inventors: John E. Janssen, Minnetonka;
Vahram S. Kardashian, Plymouth;
Paul Antonio Corbero, Minneapolis, all of Minn.

[73] Assignee: Honeywell Inc., Minneapolis, Minn.

[22] Filed: Dec. 19, 1973

[21] Appl. No.: 426,268

[52] U.S. Cl. ............... 73/194 B, 73/DIG. 2, 73/228
[51] Int. Cl. ............................................. G01f 1/00
[58] Field of Search . 73/194 E, 194 B, 228, DIG. 2; 336/20; 324/34

[56] References Cited
UNITED STATES PATENTS

| | | | |
|---|---|---|---|
| 3,114,261 | 12/1963 | Dillon et al. | 73/228 |
| 3,116,639 | 1/1964 | Bird | 73/194 B |
| 3,229,512 | 1/1966 | Goudswaard et al. | 73/DIG. 2 |
| 3,774,134 | 11/1973 | Kardashian et al. | 324/34 ST UX |

*Primary Examiner*—Charles A. Ruehl
*Attorney, Agent, or Firm*—Omund R. Dahle

[57] ABSTRACT

A thin film magnetostrictive sensor for a fluid flowmeter comprising a spring wire of beryllium copper having plated thereon an anisotropic thin film of magnetostrictive nickel-iron.

7 Claims, 8 Drawing Figures

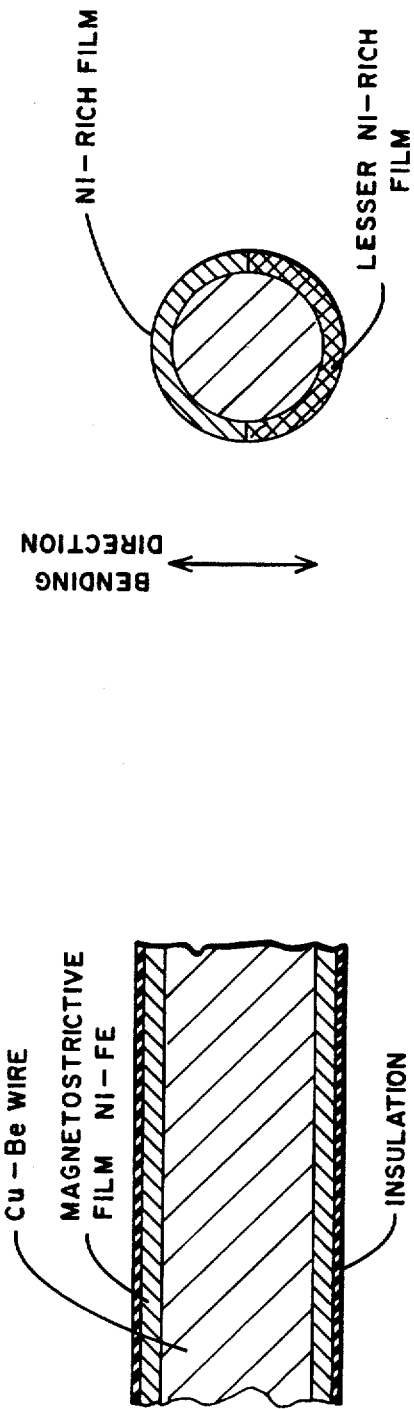
FIG. 1
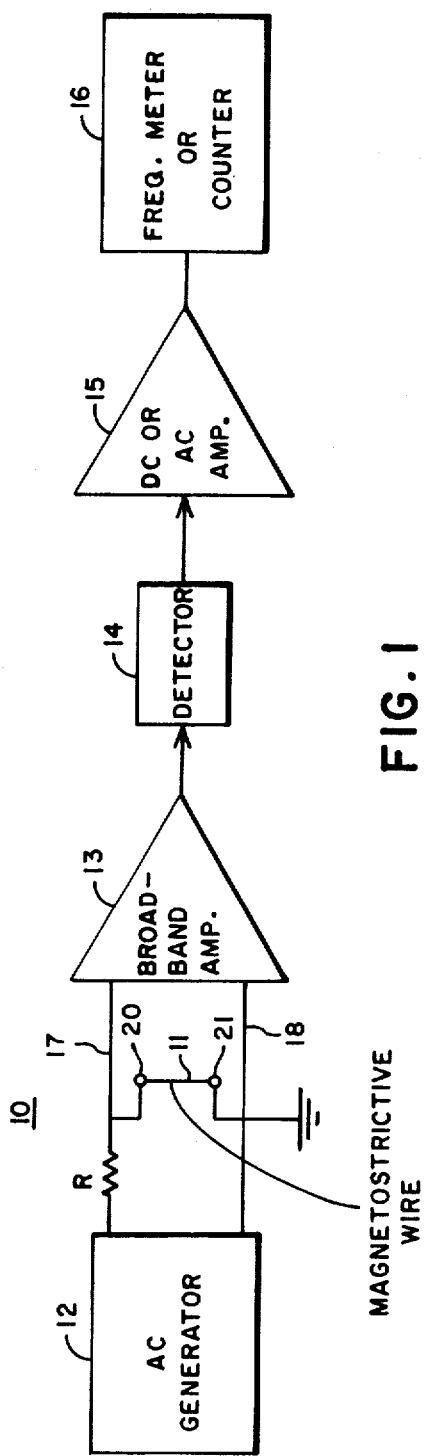
FIG. 2
FIG. 3

MAGNETOSTRICTIVE SENSOR FOR A FLOWMETER

BACKGROUND AND SUMMARY OF THE INVENTION

Various prior art flowmeters have included means for causing an oscillation or turbulence of fluid in a conduit the frequency of which is proportional to fluid velocity. The present invention is characterized by having a sensor, for such a flowmeter, which is magnetostrictive in nature. It is made of a spring wire such as beryllium copper which is plated with an anisotropic magnetostrictive magnetic thin film of nickel-iron alloy. This thin film plated wire is itself the sensor and is mounted in the flow. A drag body may be attached to the wire to augment response to fluctuating flow velocities. Turbulence in the flow caused by a bluff body, or the like, in the flowmeter causes an oscillatory or vibratory bending of the wire, the oscillatory frequency being proportional to flow rate.

The magnetostrictive sensitive sensor consists of a magnetostrictive plated wire having uniaxial anisotropy which acts as a transducer converting displacement of movement to an electrical signal. The term magnetostriction is used to describe any dimensional change in material which is associated with its magnetic behavior. Ferromagnetic bodies in particular are susceptible to dimensional changes, for instance, as a result of changes in temperature or a magnetic field. In the following description, the phenomenon of interest is the converse, where changes in strain in a magnetostrictive material induce a change in its magnetic behavior.

The output of the transducer is a function of magnetic parameters such as orientation of the magnetization vector relative to the easy axis, coercive force ($H_c$), anisotropy field ($H_k$) and inductance. If the wire plating is magnetostrictive, the output of the transducer measures either the state of the ambient magnetic field or the state of strain which the plated wire is subjected or both. In a short length of magnetostrictive wire, such as the sensor described here, the disturbing effect of strain upon the magnetization vector predominates and produces the output signal.

A permalloy plating is normally defined as an alloy of nickel and iron having approximately 80 percent nickel and 20 percent iron. Also at or about the approximate composition 80-20 percent, permalloy has a zero magnetostrictive response while an iron rich (Fe more than 20 percent) composition has a positive magnetostriction and a nickel rich (Ni more than 80 percent) composition of plating has a negative magnetostriction. In addition to selecting a positive or negative magnetostriction, the degree of magnetostriction may be selected by controlling the variance of the composition away from the zero magnetostrictive composition. If for purposes of description in the specification and claims the composition at or about 80-20 percent be accepted as the zero magnetostriction crossover, then as a composition is made increasingly iron rich to 78-22 percent or thereabout, the positive magnetostriction increases as the factor of the variance from 80-20 percent, and as the composition is made increasingly nickel rich out to 82-18 percent or thereabout, the negative magnetostriction increases as a factor of the variance from the composition of 80-20 percent.

In the Kardashian U.S. Pat. No. 3,657,641, which is assigned to the same assignee as the present invention, there is described anisotropic thin film plated wire of this nature. In that patent the permalloy film is described as being of approximate composition of 80% Ni and 20% Fe, which composition has a zero or low magnetostrictive effect. In the present invention which is a strain detector and which depends on the magnetostrictive response of the wire, it is desirable rather to enhance the magnetostrictive effect. Thus in a preferred embodiment, the wire may generally have a nickel rich plating composition, Ni content greater than 80%, and has a high negative magnetostriction. The film is in the order of 10,000 A.

The anisotropic plated wire sensor of this invention may be, for example, a 10 mil diameter non-magnetic beryllium-copper substrate wire which has been plated with an anisotropic magnetostrictive nickel-iron (permalloy) thin film, a longitudinal section of which is shown in FIG. 2, and a cross-section of which is shown in FIG. 3. The spring wire could also be phosphor-bronze or tungsten, each of the above listed types of substrate wire having a relatively low electrical resistance, good spring and fatigue qualities, non-magnetic and can be plated. During deposition of the ferromagnetic film, a magnetic field is applied so that a preferred axis, called the easy axis, is obtained which is oriented circumferentially about the wire or with some degree of skew. The magnetization vector may lie along this line in the absence of external fields and strain on the wire, and makes a loop of magnetic flux around the wire. The thin film plating may have radial and/or circumferential nonuniformity in composition and therefore exhibits different degrees of magnetostrictiveness. The wire may have a Ni rich plating composition on both the upper and lower surfaces but Ni rich to a lesser amount on one half of the circumference than the other opposite half of circumference and therefore the wire having a lesser or weaker negative magnetostriction on one surface than on the other. As shown in FIG. 3, the wire has a Ni rich plating on the upper surface or half of circumference and a lesser Ni rich composition on the lower surface. In another embodiment the wire may have a nickel rich plating composition, Ni content greater than 80% on one surface, and has negative magnetostriction, while the opposite surface, on the other hand, may have an iron rich plating composition where Fe is greater than 20% and said opposite surface wire plating has a positive magnetostriction.

In operation, a carrier frequency alternating current, sinusoidal or otherwise, is fed into the plated wire transducer which generates an alternating magnetic field in the permalloy plating around the circumference of the wire. The alternating current magnetic field sets the magnetization vector in the plating into oscillation. This in turn generates an alternating current electromotive force in the substrate core of the wire, which may be beryllium-copper. The voltage output or signal is alternating and constant in amplitude. Changes in the magnetic parameters of the anisotropic magnetostrictive elements of the film results in changes in the envelope of the signal amplitude. This appears as a modulation of the carrier similar in appearance to an amplitude modulation of a radio wave carrier. The transducer output is amplified, detected and the low frequency component representing flow rate is amplified to produce a signal to a counter or a frequency meter.

BRIEF DESCRIPTION OF THE DRAWING

FIG. 1 is a block diagram representation of the flowmeter system including the magnetostrictive sensor.

FIGS. 2 and 3 show the nature of the magnetostrictive plated wire sensor.

DESCRIPTION

Figure 4:
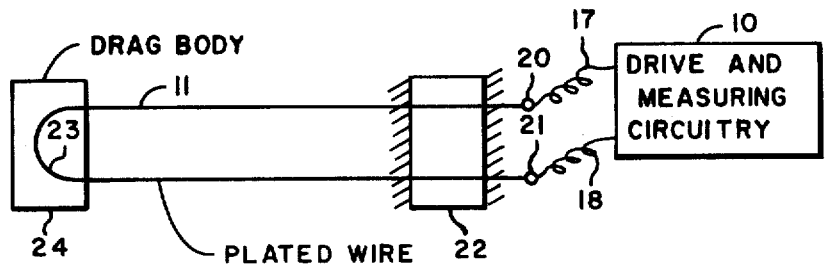
FIGS. 4 to 7 and 7a show the magnetostrictive sensor in several applications of flow sensing.

Referring now to the block diagram of FIG. 1 there is generally shown at 10 a drive and measuring system for a flowmeter using a magnetostrictive plated wire sensor 11. The drive portion of the system is an ac generator 12, such as a high frequency sine-wave oscillator having an output circuit connected to drive the plated wire sensor. This high frequency is in the nature of a carrier frequency, such as 10 megahertz for example, and it is connected in energizing or driving relation to the sensor wire. When the sensor is deflected due to flow, a strain thereby appearing in the wire, the strain causes changes in the magnetic parameters which modulate the carrier wave. The measuring portion of the system 10 may include a conventional broad band amplifier 13 to increase the level of the flow modulated carrier wave, a detector or demodulator 14 to recover the low frequency modulation from the carrier, and a low frequency amplifier 15. The output of the amplifier 15 is connected to a suitable frequency meter or counter 16.

Referring now to FIGS. 2 and 3 there is shown a length of a magnetostrictive thin-film plated wire, and which may have, for example, a 10 mil diameter beryllium-copper substrate wire which has been plated with a magnetic permalloy film having uniaxial anisotropy and being of approximate average composition of 81 percent nickel and 19 percent iron. This nickel rich film has a negative magnetostriction. During deposition of the ferromagnetic film, a magnetic field is applied so that a preferred axis, called the easy axis is obtained which is oriented circumferentially about the wire or with a small skew. The magnetization vector may lie along this axis in the absence of external fields and make a loop of magnetic flux around the wire. The axis perpendicular to the easy axis is called the hard axis and its direction is more nearly along the wire. The plated wire may be insulated if necessary to protect the sensor from corrosive fluids and/or electrically conductive fluids, the flow rate of which is being measured. The longitudinal section shown in FIG. 2 includes such insulation while in the cross-section of FIG. 3 the insulative covering is not shown.

Figure 5:
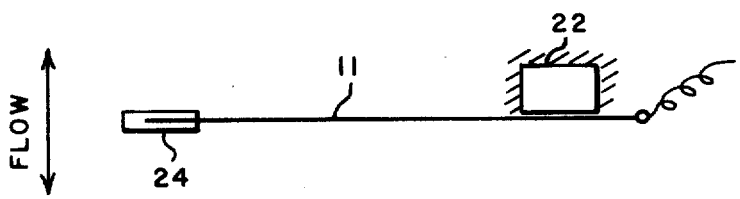

Several flowmeter applications of the magnetostrictive sensor 11 are shown in FIGS. 4–7. In FIGS. 4 and 5 the magnetostrictive plated wire sensor 11 is preferably formed in the general shape of a hairpin or U, the open end represented by terminals 20 and 21 being fastened to a fixed surface or support 22, and the closed end 23 being fastened to a suitable plate or drag body 24. The sensor wire 11 and drag body 24 extend into the fluid flow path as shown in FIG. 5, and fluid motion to be detected acts against the drag body to deflect the wire and thus produce a signal. The sensor works well to sense the fluctuating flow in a shedding vortex flowmeter or a fluidic flowmeter. The curved end section 23 of the sensor wire may be deplated or otherwise desensitized.

Figure 6:
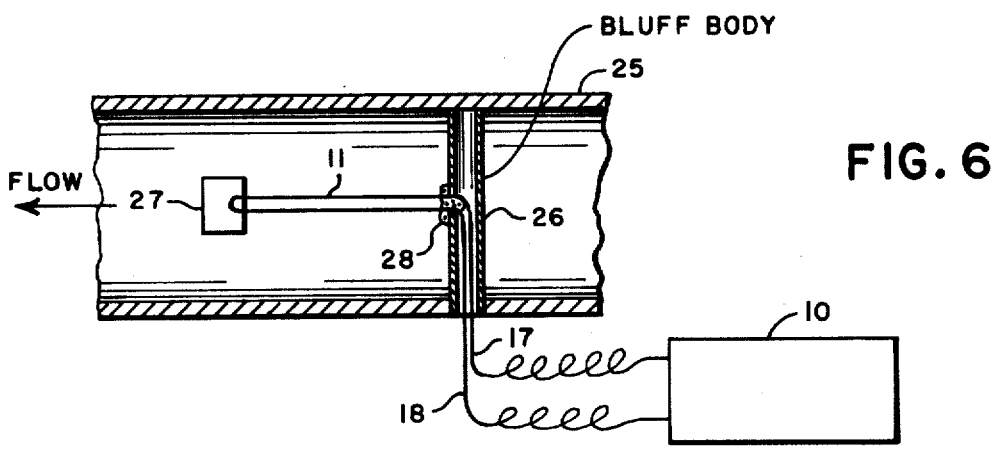

In FIG. 6, the magnetostrictive plated wire sensor 11 is again preferably of a hairpin shape, and is mounted so that its axis is parallel with the flow. Within the conduit 25 which carries the flow to be measured, a bluff body 26 is mounted normal to the flow direction. It is well known that as the fluid flows around this bluff body Karman vortices are generated. This introduces a periodic turbulence in the flow stream in such a way that the frequency is proportional to the flow velocity. These turbulent vortices contain velocity components that are at right angles to the flow direction and act on the flat surface of a drag body 27. Thus the drag body and wire are subjected to oscillating forces that are proportional to fluid velocity. The drag body 27 can be a flat plate parallel with the flow which acts as an oscillating vane.

Figure 7:
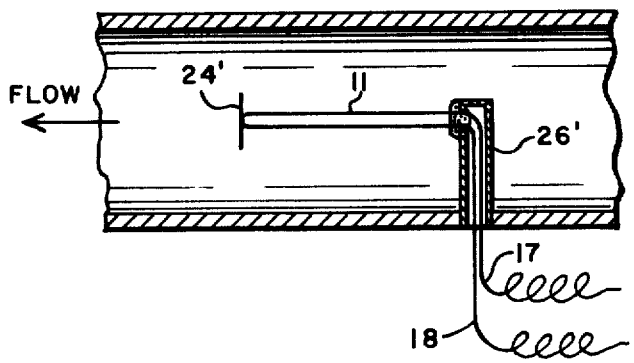

In a different embodiment as shown in FIG. 7, the drag body 24' is a flat plate, disk, cone or cup mounted in the center of the conduit with its flat side perpendicular to the flow direction and the plated wire 11 axis parallel to the flow direction. The sensor is mounted on a support 26' streamlined to minimize turbulence. Flow of the fluid against the drag body sets up an unstable force. If the drag body is deflected in any direction normal to the flow, the angles between the body surface, the support and the flow direction change causing the flow over the body to shift. This results in an oscillatory force that is amplified by the flow velocity. If the drag body is axially symmetric, it will rotate in an orbital fashion producing an oscillatory strain in the wire. If the drag body has two dimensional symmetry, i.e., a rectangular shape, it will oscillate back and forth with one dimensional motion. In all cases the rate of vibration will be proportional to the flow velocity.

Figure 7A:
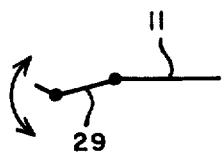

FIG. 7a, which is rotated 90° with respect to FIG. 7, is similar in structure to FIG. 7 but has an articulated vane 29 as a drag body, this vane being of the general type taught in the Medlar flowmeter U.S. Pat. No. 3,175,399, and assigned to the same assignee as the present invention. In each case the periodic bending of the magnetostrictive wire produces a fluctuating signal, the frequency of which is proportional to flow velocity.

The embodiments of the invention in which an exclusive property or right is claimed are defined as follows:

1. A flowmeter of the type having a turbulence induced therein which has an oscillatory type component, the repetition rate of which is a function of flow rate, the combination comprising:
   a magnetostrictive flow sensing means comprising a length of spring wire having plated thereon a magnetically anisotropic magnetostrictive thin-film,
   means mounting said wire to extend into a fluid flow path, whereby the oscillatory type component of flow causes a vibratory deflection of said plated wire, the frequency of said vibratory deflection being a function of flow rate, and
   a.c. generator means for energizing said plated wire with a carrier type wave and wherein said vibratory deflection of said wire effects a modulation of said carrier wave, said plated wire further having terminal means connected to frequency responsive signal output measuring means.

2. The invention according to claim 1 wherein said wire is beryllium-copper spring wire.

3. The invention according to claim 1 wherein the thickness of said wire plating is in the order of 10,000 angstroms.

4. The invention according to claim 1 wherein said thin-film plating is of a nickel-iron alloy.

5. The invention according to claim 1 wherein said frequency responsive signal output measuring means includes detector and amplifier means.

6. The invention according to claim 1 wherein said magnetostrictive flow sensing means further comprises a drag body attached to said spring wire to augment deflection of said wire in response to flow.

7. A sensor apparatus for a fluid flowmeter comprising:
 a length of non-magnetic spring wire plated with an anisotropic magnetic thin-film which is highly non-zero magnetostrictive for a sensor, wherein the plating on one half of circumference of said wire differs materially in magnetostriction from that of the opposite half of circumference;
 means including a source of high frequency carrier energy connected to energize said sensor wire;
 means mounting said sensor wire such that at least a portion of said wire extends into a fluid flow path to be metered, said sensor wire being subject to bending as a function of fluid flow, the bending of said energized sensor wire providing an output signal;
 and output means including detector means connected to receive an output signal from said sensor wire and provide an indication thereof.

* * * * *